Patented Nov. 18, 1941

2,262,779

UNITED STATES PATENT OFFICE 2,262,779

QUINIC ACID SALTS OF AROMATIC SULPHONAMIDES

Robert S. Shelton, Mariemont, Ohio, assignor to The Wm. S. Merrell Company, Reading, Ohio, a corporation of Delaware No Drawing. Application July 21, 1939,
Serial No. 285,804

2 Claims. (Cl. 260—397.7)

This invention relates to new salts of quinic acid which have valuable therapeutic properties.

Quinic acid is a product which occurs naturally in several plants. It is a hexahydro-tetra-hydroxybenzoic acid, usually represented by the structure

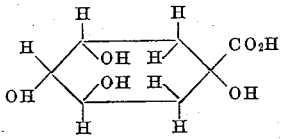

The present invention provides new salts of quinic acid which have valuable therapeutic properties. The exact structure of many of these new salts is not known to me, because in the salt formation, one or more of the hydroxyl groups as well as the carboxyl group may be involved.

In accordance with the present invention, salts of quinic acid with aromatic sulphonamides having a benzene radical substituted in para positions by an amino radical and sulphonamide radical are provided. In general, these salts have therapeutic properties of the same nature as salts of the same amines with other acids and have the same uses as such salts with other acids have; but the new compounds have important advantages because of improved assimilation or absorption, increased stability, increased tolerance, decreased irritation, decreased side reactions and general potentiation of the amine by the quinic acid. The salts have important advantages because they are neutral and have relatively high solubility in water, and hence are well adapted for intravenous or intramuscular injection, in therapeutic dosage, in contrast with the various known salts of such amines.

The new compounds are the salts of quinic acid with sulphanilamide and its congeners, e. g., 4,4'-diamino-diphenyl-sulphone, sulphanilyl-sulphanilamide, 4-sulphoneamido-2,4-diamino-azo-benzene, and sulphpyridine.

The new compounds of the invention may be prepared in various ways. Quinic acid is readily soluble in water, and the salts may be prepared by dissolving the quinic acid in dilute alkali, e. g., dilute sodium or ammonium hydroxide solution, and adding to this solution the free amine base or an acid addition salt thereof. Or, the compounds may be prepared by dissolving the quinic acid in water and treating the resulting solution with the amine the salt of which is desired, by adding the free base as such or by adding it in solution, as in hot alcohol. In general, any of the usual synthetic methods for the preparation of salts of this type may be used. The salts, when prepared as described, are obtained in solution in water; but most of them, if desired in solid form, may be obtained in such form by drying under vacuum and may be purified by recrystallization. Small quantities of suitable anti-oxidants, such as hydroquinone, the butyl ether of hydroquinone, or d-isoascorbic acid may be added to the solutions to stabilize them. Buffer salts, such as sodium citrate or phosphate may be incorporated to buffer the solutions; and in some cases, particularly with the more insoluble compounds, stabilizing agents, such as sucrose, glucose and the like may be advantageously added to stabilize the solution. The new compounds, the quinic acid, and its solutions, should be kept out of contact with air or oxygen, as quinic acid and the quinates are readily oxidized. Hence, in preparing the new compounds, or aqueous solutions of quinic acid or quinates, deoxygenated, e. g., boiled, water should be used, and the various operations, and final sealing, should be in an inert atmosphere, advantageously a carbon dioxide or nitrogen atmosphere.

The invention will be further illustrated by the following specific example, but it is not limited thereto.

*Example.*—1/100 mol of sulphanilamide in 10 c. c. of water is converted to the hydrochloride by the addition of 5 c. c. of 2/N hydrochloric acid. To the resulting solution is then added sodium quinate, prepared by reacting 1/100 mol of quinic acid with 5 c. c. of 2/N sodium hydroxide solution in 90 c. c. of water. The solutions are mixed and diluted to 115 c. c. The resulting solution contains sulphanilamide quinate in a concentration of 1½%. This product, when sealed in ampoules and sterilized is valuable for intravenous or intramuscular injection for the treatment of coccus infections, particularly streptoccus infections.

In a similar manner, the quinates of the congeners and homologues of sulphanilamide, such as 4,4-diamino, diphenyl-sulphone, sulphanilyl-sulphanilamide, and the like may be readily prepared. All of these quinates are relatively water-soluble and are useful for intravenous or intramuscular injection for the treatment of coccus, particularly streptococcus infections.

Thus the present invention provides a new series of salts of quinic acid which have important advantages as therapeutic agents, because of improved assimilation or absorption, increased stability, increased tolerance, decreased irritation and side reactions, and potentiation of the basic constituents by the quinic acid. The salts have the further important advantage of being substantially neutral and having relatively high water-solubility, as compared with most of the previously known salts of such therapeutic agents, which are either relatively soluble in water or, in aqueous solution, have quite a low pH and hence are very irritating when injected.

I claim:

1. Salts of quinic acid with aromatic sulphonamides having a benzene radical substituted in para positions by an amino radical and a sulphonamide radical.

2. Sulphanilamide quinate.

ROBERT S. SHELTON.